US009835503B2

United States Patent
Shida

(10) Patent No.: US 9,835,503 B2
(45) Date of Patent: Dec. 5, 2017

(54) OPTICAL FIBER TEMPERATURE DISTRIBUTION MEASURING DEVICE

(71) Applicant: YOKOGAWA ELECTRIC CORPORATION, Musashino-shi, Tokyo (JP)

(72) Inventor: Hideo Shida, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 255 days.

(21) Appl. No.: 14/751,365

(22) Filed: Jun. 26, 2015

(65) Prior Publication Data

US 2016/0018271 A1    Jan. 21, 2016

(30) Foreign Application Priority Data

Jul. 16, 2014 (JP) ................... 2014-146103

(51) Int. Cl.

| G01K 11/00 | (2006.01) |
|---|---|
| G01K 15/00 | (2006.01) |
| G01J 5/00 | (2006.01) |
| G01K 5/00 | (2006.01) |
| G01K 11/32 | (2006.01) |

(52) U.S. Cl.
CPC ........ *G01K 11/32* (2013.01); *G01K 2011/324* (2013.01)

(58) Field of Classification Search
USPC .............. 374/161, 131, 124, 137, 1
See application file for complete search history.

(56) References Cited

U.S. PATENT DOCUMENTS

| 8,152,370 | B2 * | 4/2012 | Martinelli | G01K 11/32 |
|---|---|---|---|---|
| | | | | 374/131 |
| 8,858,069 | B2 * | 10/2014 | Agawa | G01K 11/32 |
| | | | | 374/1 |
| 2007/0280329 | A1 * | 12/2007 | Kawauchi | G01J 5/08 |
| | | | | 374/131 |
| 2010/0040108 | A1 * | 2/2010 | Sasaoka | G01K 11/32 |
| | | | | 374/120 |
| 2013/0100984 | A1 | 4/2013 | Agawa | |
| 2015/0214251 | A1 | 7/2015 | Seo et al. | |
| 2015/0241251 | A1 | 8/2015 | Uno et al. | |

FOREIGN PATENT DOCUMENTS

| JP | 5-264370 A | 10/1993 |
|---|---|---|
| JP | 2000-329646 A | 11/2000 |
| WO | 2014064771 A1 | 5/2014 |

* cited by examiner

*Primary Examiner* — Mirellys Jagan
(74) *Attorney, Agent, or Firm* — Sughrue Mion, PLLC

(57) ABSTRACT

An optical fiber temperature distribution measuring device includes: an optical fiber as a sensor; a calculation control unit for measuring a temperature distribution along the optical fiber by using backward Raman scattered light from the optical fiber; a far-end-position dispersion characteristic calculation unit for obtaining a dispersion characteristic of the optical fiber at a far-end position thereof; a per-unit-length dispersion characteristic calculation unit for obtaining a per-unit-length dispersion characteristic of the optical fiber based on the dispersion characteristic of the optical fiber at the far-end position thereof; and a correction parameter calculation unit for calculating a correction parameter for correcting a dispersion characteristic of the optical fiber based on a dispersion characteristic at each of different positions along the optical fiber.

9 Claims, 2 Drawing Sheets

OPTICAL FIBER TEMPERATURE DISTRIBUTION MEASURING DEVICE

CROSS-REFERENCE TO RELATED APPLICATION

This application claims priority from Japanese Patent Application No. 2014-146103 filed with the Japan Patent Office on Jul. 16, 2014, the entire content of which is hereby incorporated by reference.

BACKGROUND

1. Technical Field

An embodiment of the present disclosure relates to an optical fiber temperature distribution measuring device using an optical fiber as a sensor.

2. Description of the Related Art

Optical fiber temperature distribution measuring devices that are described in JP-A-5-264370 are a type of distributed measuring devices using an optical fiber as a sensor. The optical fiber temperature distribution measuring device is configured to measure a temperature distribution along the optical fiber. This technique utilizes backscattered light occurring inside an optical fiber. Note that an optical fiber temperature distribution measuring device is also referred to as a DTS (Distributed Temperature Sensor) as necessary in the description below.

Types of backscattered light include Rayleigh scattered light, Brillouin scattered light, Raman scattered light, and the like. Temperature measurements utilize backward Raman scattered light, which has a high temperature dependence. A temperature measurement is performed through wavelength separation of the backward Raman scattered light. Backward Raman scattered light includes anti-Stokes light AS whose wavelength is shorter than that of incident light, and Stokes light ST whose wavelength is longer than that of incident light.

An optical fiber temperature distribution measuring device measures the intensity Ias of anti-Stokes light and the intensity Ist of Stokes light to calculate the temperature based on the intensity ratio therebetween, and further produces and displays the temperature distribution along the optical fiber. Optical fiber temperature distribution measuring devices have been used in fields such as temperature control in plant facilities, disaster prevention-related investigations and researches, air-conditioning for power plants and large buildings, and the like.

JP-A-2000-329646 proposes a technique relating to an OTDR (Optical Time Domain Reflectometry) measurement used in failure point search and loss distribution measurement of an optical fiber transmission path. According to the technique of this document, the OTDR distribution is corrected by using an expression (F−F*ϵ+F*ϵ*ϵ− . . . ), where ϵ is the time function of the inter-pulse portion of the transmission waveform, F is the time function of the OTDR distribution actually measured, and * is a symbol representing a convolution calculation.

SUMMARY

An optical fiber temperature distribution measuring device includes: an optical fiber as a sensor; a calculation control unit for measuring a temperature distribution along the optical fiber by using backward Raman scattered light from the optical fiber; a far-end-position dispersion characteristic calculation unit for obtaining a dispersion characteristic of the optical fiber at a far-end position thereof; a per-unit-length dispersion characteristic calculation unit for obtaining a per-unit-length dispersion characteristic of the optical fiber based on the dispersion characteristic of the optical fiber at the far-end position thereof; and a correction parameter calculation unit for calculating a correction parameter for correcting a dispersion characteristic of the optical fiber based on a dispersion characteristic at each of different positions along the optical fiber.

DESCRIPTION OF THE EMBODIMENTS

Figure 1:
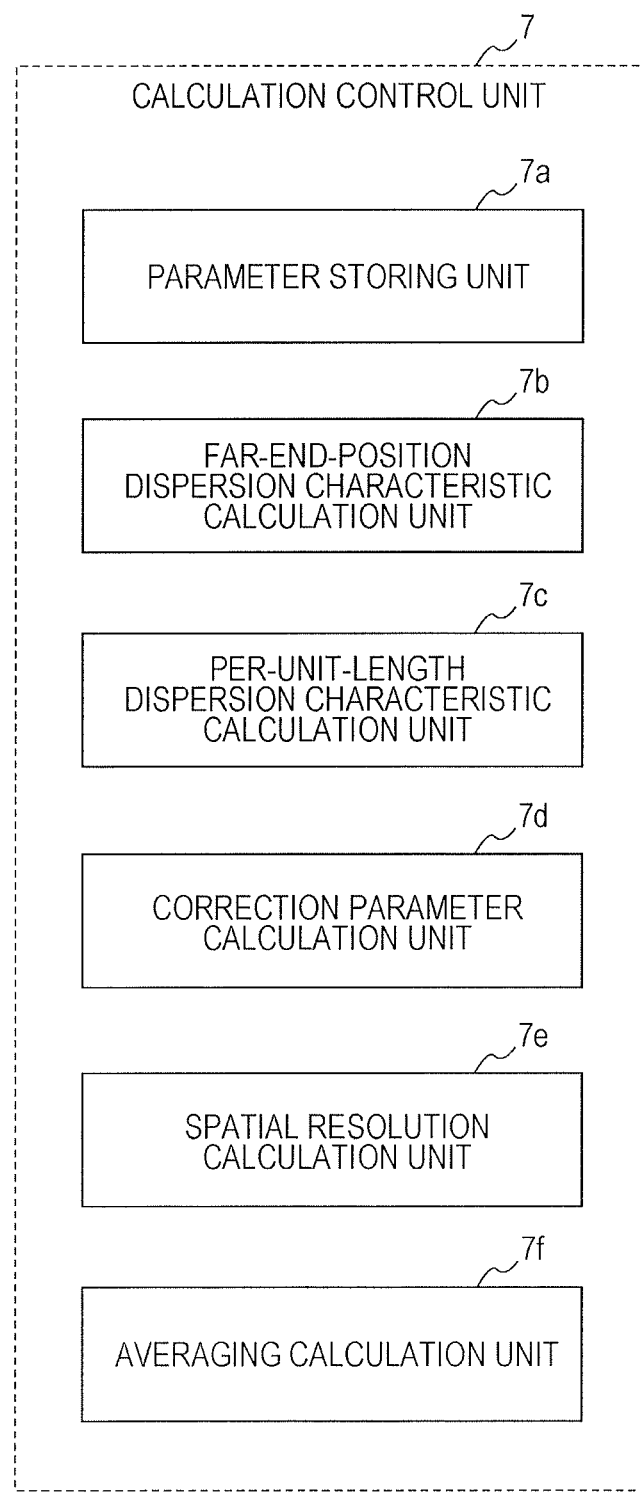
FIG. 1 is a block diagram showing a calculation control unit (main unit) of an optical fiber temperature distribution measuring device according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a DTS, pulsed light is input to an optical fiber. The temperature distribution along the optical fiber is measured by performing a predetermined calculation by using the received power of the backward Raman scattered light (the Stokes light and the anti-Stokes light) of the pulsed light. The pulsed light input to the optical fiber, the received Stokes light, the received anti-Stokes light, and the like, are influenced by dispersion while traveling through the optical fiber. Primary forms of dispersion are the wavelength dispersion and the mode dispersion.

Wavelength dispersion is a phenomenon that is occurred due to the variation of the distance over which light travels through an optical fiber depending on the wavelength. By using DFB (Distributed Feedback) laser, it is possible to reduce the influence of the wavelength dispersion on the incident light. However, backward Raman scattered light is influenced by wavelength dispersion because backward Raman scattered light has a wavelength bandwidth.

Mode dispersion occurs when a multi-mode fiber is used as an optical fiber. A multi-mode fiber has a plurality of propagation modes. The width of pulsed light widens as the pulsed light travels while branching into different modes depending on the propagation speed. This phenomenon is referred to as the mode dispersion.

A GI (Grated Index) fiber is used, for example, in order to reduce the mode dispersion. In this way, however, it is difficult to eliminate the influence of the mode dispersion. Moreover, due to the influence of the mode dispersion, different propagation characteristics are exhibited for the outward path and the return path along the fiber. Note that there is no such mode dispersion when a single-mode fiber is used.

One of the indices representing the performance of a DTS is the spatial resolution. The spatial resolution is the response distance of temperature change converted into a number. The shorter the distance is, the better the performance of the DTS is. Note however that as light travels through the fiber, the light is influenced by the dispersion described above. Therefore, the spatial resolution of the DTS decreases.

As the spatial resolution decreases, backscattered light at the position where the measurement is intended to be performed (the changing point) interferes with backscattered light upstream and downstream of that position. As a result, it is difficult to obtain the actual temperature in the vicinity of the changing point.

Now, a multi-mode fiber is less expensive than a single-mode fiber. However, it has been regarded that a multi-mode fiber is not suitable for long-distance transmission because light traveling through a multi-mode fiber is significantly influenced by dispersion. That is, a single-mode fiber has been used for long-distance transmission. Therefore, the influence of wavelength dispersion in long-distance transmission has rarely been seen as a problem, as opposed to a case where a multi-mode fiber is used.

However, problems arising from the influence of dispersion have surfaced now as it has become a practice to perform a long-distance DTS measurement by using a multi-mode fiber.

In order to correct the influence of dispersion in a multi-mode fiber, the dispersion characteristic of the multi-mode fiber is grasped in advance. However, since there are many variable factors such as the wavelength to be used and the optical fiber to be used, it is difficult to identify the dispersion characteristic of a multi-mode fiber.

An object of the present disclosure is to provide an optical fiber temperature distribution measuring device having good spatial resolution by being capable of appropriately grasping the dispersion characteristic at each of different positions along a sensor fiber (optical fiber) and making a correction such that the dispersion characteristic is canceled out.

An optical fiber temperature distribution measuring device (the present measurement device) according to one embodiment of the present disclosure includes: an optical fiber as a sensor; a calculation control unit for measuring a temperature distribution along the optical fiber by using backward Raman scattered light from the optical fiber; a far-end-position dispersion characteristic calculation unit for obtaining a dispersion characteristic of the optical fiber at a far-end position thereof; a per-unit-length dispersion characteristic calculation unit for obtaining a per-unit-length dispersion characteristic of the optical fiber based on the dispersion characteristic of the optical fiber at the far-end position thereof; and a correction parameter calculation unit for calculating a correction parameter for correcting a dispersion characteristic of the optical fiber based on a dispersion characteristic at each of different positions along the optical fiber.

In the present measurement device, the correction parameter calculation unit may be configured to obtain the correction parameter by performing a convolution calculation of an inverse characteristic of the dispersion characteristic at each of different positions along the optical fiber and an inverse characteristic of a response characteristic of a body of the optical fiber temperature distribution measuring device.

The correction parameter calculation unit may be configured to obtain the dispersion characteristic at each of different positions along the optical fiber and the inverse characteristic thereof from the per-unit-length dispersion characteristic of the optical fiber.

The far-end-position dispersion characteristic calculation unit may be configured to obtain the dispersion characteristic of the optical fiber at the far-end position thereof by convoluting a response characteristic of the optical fiber at the far-end position thereof with an inverse characteristic of a response characteristic of the body of the optical fiber temperature distribution measuring device.

The calculation control unit may be configured to obtain the response characteristic of the optical fiber at the far-end position thereof using a known parameter of the optical fiber.

The calculation control unit may be configured to obtain the response characteristic of the body of the optical fiber temperature distribution measuring device based on a result of a level measurement of the backward Raman scattered light with the optical fiber unconnected to the body of the optical fiber temperature distribution measuring device.

The present measurement device may further includes: an averaging calculation unit for obtaining a linear value of Stokes light and a linear value of anti-Stokes light by averaging the Stokes light and the anti-Stokes light, respectively, of the backward Raman scattered light; and a spatial resolution calculation unit for performing a calculation of convoluting the correction parameter with the linear value of the Stokes light and the linear value of the anti-Stokes light.

The far-end-position dispersion characteristic calculation unit may be configured to obtain the dispersion characteristic of the optical fiber at the far-end position thereof by performing a first calculation of convoluting a characteristic of a filter for removing a noise component on a high-frequency side with the linear value of the Stokes light and the linear value of the anti-Stokes light, and a second calculation of convoluting an inverse characteristic of the characteristic of the filter and an inverse characteristic of a response characteristic of a body of the optical fiber temperature distribution measuring device with a result obtained by the first calculation.

The far-end-position dispersion characteristic calculation unit may be configured to obtain the dispersion characteristic of the optical fiber at the far-end position thereof by convoluting an inverse characteristic of a characteristic of a filter for removing a noise component on a high-frequency side and an inverse characteristic of a response characteristic of a body of the optical fiber temperature distribution measuring device with a response characteristic of the optical fiber at the far-end position thereof.

According to the present measurement device, an optical fiber temperature distribution measuring device having good spatial resolution can be obtained.

An embodiment of the present disclosure will now be described in detail with reference to the drawings.

Figure 2:
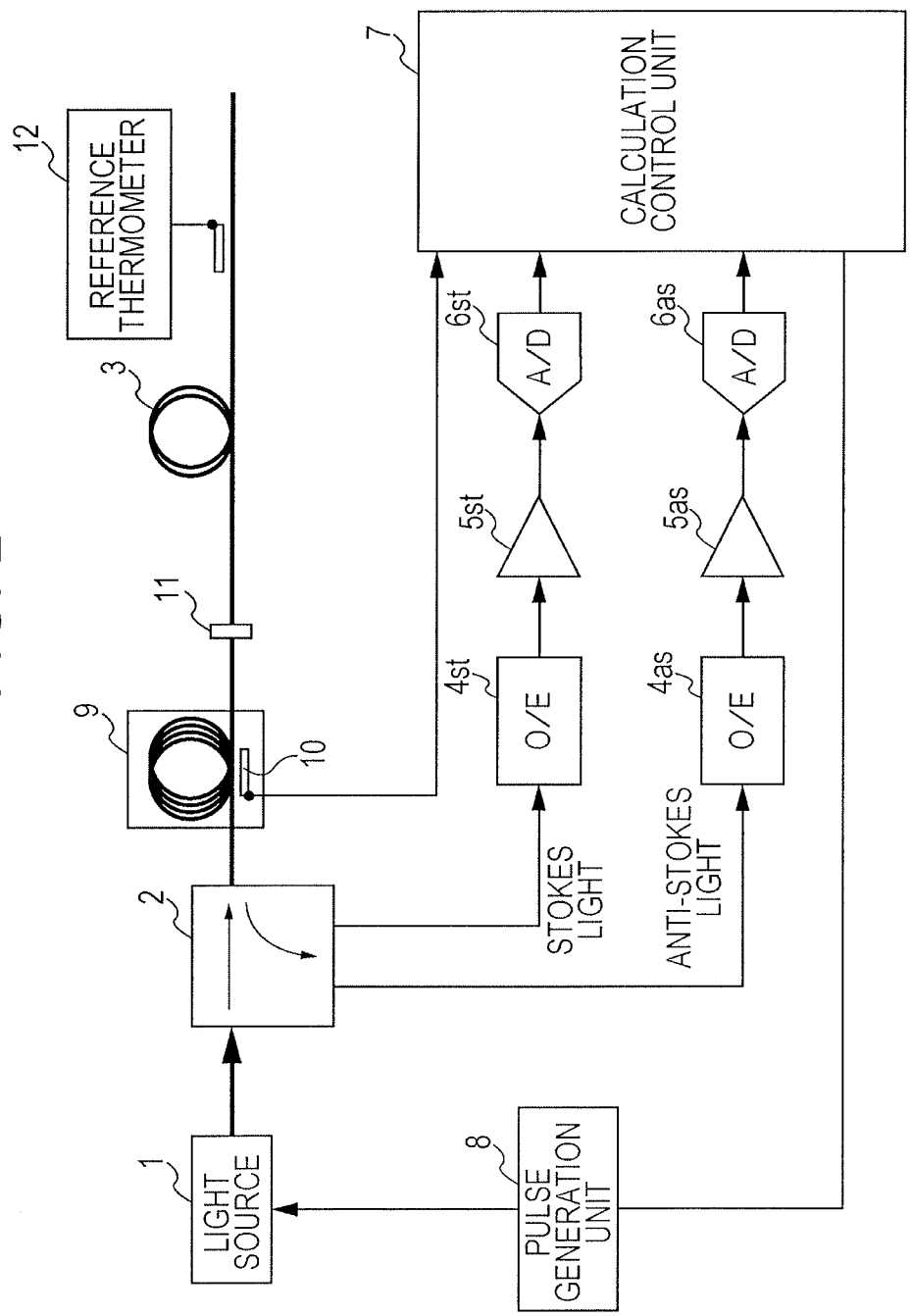
FIG. 2 is a block diagram showing a configuration of an optical fiber temperature distribution measuring device according to an embodiment.

FIG. 2 is a block diagram showing a configuration of an optical fiber temperature distribution measuring device of the present embodiment (the present measurement device). As shown in FIG. 2, the present measurement device includes a light source 1, an optical branching device 2, an optical fiber 3, an optoelectronic converter (hereinafter referred to as an O/E converter) 4*st*, an O/E converter 4*as*, an amplifier 5*st*, an amplifier 5*as*, an A/D converter 6*st*, an A/D converter 6*as*, a calculation control unit 7, a pulse generation unit 8, a temperature reference unit 9, a thermometer 10, a connector connection unit 11, and a reference thermometer 12.

The light source 1 is connected to the input end of the optical branching device 2. The optical fiber 3 as a temperature sensor is connected to the input/output end of the optical branching device 2 via the temperature reference unit 9 and the connector connection unit 11. The O/E converter 4*st* is connected to one output end of the optical branching device 2. The O/E converter 4*as* is connected to the other output end of the optical branching device 2.

The output terminal of the O/E converter 4st is connected to the calculation control unit 7 through the amplifier 5st and the A/D converter 6st. The output terminal of the O/E converter 4as is connected to the calculation control unit 7 through the amplifier 5as and the A/D converter 6as. Note that the calculation control unit 7 is connected to the light source 1 through the pulse generation unit 8.

The light source 1 may be a laser diode, for example. The light source 1 outputs pulsed light corresponding to the timing signal from the calculation control unit 7, which is input through the pulse generation unit 8. The optical branching device 2 has an input end, an input/output end, and two output ends. The input end of the optical branching device 2 receives pulsed light output from the light source 1. The input/output end of the optical branching device 2 outputs pulsed light toward the optical fiber 3. The input/output end of the optical branching device 2 also receives backward Raman scattered light occurring inside the optical fiber 3. The optical branching device 2 performs wavelength separation of the received backward Raman scattered light into Stokes light ST and anti-Stokes light AS. The input end of the optical fiber 3 receives pulsed light output from the optical branching device 2. The backward Raman scattered light occurring inside the optical fiber 3 is output from the input end of the optical fiber 3 toward the optical branching device 2.

The O/E converters 4st and 4as may be photodiodes, for example. The O/E converter 4st receives the Stokes light ST output from one output end of the optical branching device 2. The O/E converter 4as receives the anti-Stokes light AS output from the other output end of the optical branching device 2. The O/E converters 4st and 4as each output an electrical signal corresponding to the incident light.

The amplifiers 5st and 5as amplify electrical signals output from the O/E converters 4st and 4as, respectively. The A/D converters 6st and 6as convert signals output from the amplifiers 5st and 5as into digital signals.

The calculation control unit 7 calculates the temperature from the intensity ratio between two components of the backward Raman scattered light, i.e., the intensity ratio between the Stokes light ST and the anti-Stokes light AS based on the digital signals output from the A/D converters 6st and 6as. The calculation control unit 7 also identifies the point at which the backward Raman scattered light has occurred based on the time when the digital signal is received according to the backward Raman scattered light. Moreover, the calculation control unit 7 obtains the temperature distribution along the optical fiber 3 based on the calculated temperature and the identified point at which the backward Raman scattered light has occurred. Moreover, the calculation control unit 7 displays the obtained temperature distribution on a display (not shown). Note that the relationship between the intensity ratio and the temperature is pre-stored in the calculation control unit 7 in the form of a table or formulas. The calculation control unit 7 sends a timing signal to the light source 1 in order to control the timing for outputting an optical pulse from the light source 1.

The temperature reference unit 9, including tens of meters of a wound optical fiber, is provided between the optical branching device 2 and the optical fiber 3 via the connector connection unit 11. The temperature reference unit 9 is provided with the thermometer 10 including a platinum resistance temperature sensor, for example, for measuring the actual temperature. The output signal of the thermometer 10 is input to the calculation control unit 7. Note that the reference thermometer 12 including a platinum resistance temperature sensor, for example, for measuring the actual temperature is also provided in the vicinity of the optical fiber 3 used as a temperature sensor.

The principle of the temperature distribution measurement will be described. Assume that the signal intensities of the Stokes light ST and the anti-Stokes light AS are each represented by a function of time with respect to a point in time at which light is emitted from the light source 1. Since the speed of light through the optical fiber 3 is known, this function can be substituted with a function of distance along the optical fiber 3 with respect to the light source 1. That is, this function can be regarded as being a function where the horizontal axis represents the distance and the vertical axis the intensities of the Stokes light ST and the anti-Stokes light AS occurring at different distance positions along the optical fiber, i.e., a distance distribution.

On the other hand, the anti-Stokes light intensity Ias and the Stokes light intensity Ist are both dependent on the temperature of the optical fiber 3. Moreover, the intensity ratio Ias/Ist therebetween is also dependent on the temperature of the optical fiber 3. Therefore, once the intensity ratio Ias/Ist is known, it is possible to know the position at which the backward Raman scattered light has occurred. Now, the intensity ratio Ias/Ist is a function of the distance x, i.e., Ias(x)/Ist(x). Therefore, it is possible to obtain the temperature distribution T(x) along the optical fiber 3 based on the intensity ratio Ias(x)/Ist(x).

FIG. 1 is a block diagram showing a main unit (the calculation control unit 7) of the present measurement device. As shown in FIG. 1, the calculation control unit 7 includes a parameter storing unit 7a, a far-end-position dispersion characteristic calculation unit 7b, a per-unit-length dispersion characteristic calculation unit 7c, a correction parameter calculation unit 7d, a spatial resolution calculation unit 7e, and an averaging calculation unit 7f.

When obtaining the temperature distribution along the optical fiber 3, for example, the calculation control unit 7 corrects the dispersion characteristic of the optical fiber. In order to correct the dispersion characteristic of the optical fiber 3, the calculation control unit 7 obtains the dispersion characteristic of the optical fiber 3. The dispersion characteristic is not a constant value since it varies depending on factors such as individual differences among optical fibers 3. Various known parameters of the optical fiber 3 to be used are input to the parameter storing unit 7a. Then, the dispersion characteristic is obtained at an arbitrary position along the optical fiber 3 to be used.

The far-end-position dispersion characteristic calculation unit 7b obtains the dispersion characteristic $D_{end}$ of the optical fiber 3 at the far-end position thereof. The relationship between the dispersion characteristic $D_{end}$ of the optical fiber 3 at the far-end position thereof, the response characteristic A of the body of the DTS, and the response characteristic H of the optical fiber 3 at the far-end position thereof is represented by Expression (1) below. Note that "*" is a symbol representing a convolution calculation. The body of the DTS refers to a portion of the configuration of the present measurement device shown in FIG. 2, excluding the optical fiber 3 and the reference thermometer 12.

$$H = A * D_{end} \tag{1}$$

Therefore, the far-end-position dispersion characteristic calculation unit 7b convolutes the response characteristic H of the optical fiber 3 at the far-end position thereof with the inverse characteristic $A^{-1}$ of the response characteristic A of the body of the DTS as shown in Expression (2) below, thereby obtaining the dispersion characteristic $D_{end}$ of the optical fiber 3 at the far-end position thereof.

$$D_{end}=H*A^{-1} \qquad (2)$$

Regarding the response characteristic H of the optical fiber 3 at the far-end position thereof, the user inputs, to the parameter storing unit 7a, various known parameters of the optical fiber 3 to be used for the measurement, by using an input device (not shown). The calculation control unit 7 (or the far-end-position dispersion characteristic calculation unit 7b) obtains the response characteristic H of the optical fiber 3 at the far-end position thereof based on the known parameters of the optical fiber 3, which have been input to the parameter storing unit 7a. The response characteristic H of the optical fiber 3 at the far-end position thereof, obtained as described above, may be stored in the parameter storing unit 7a.

Regarding the inverse characteristic $A^{-1}$ of the response characteristic A of the body of the DTS, once the response characteristic A of the body of the DTS is known, the inverse characteristic $A^{-1}$ thereof is also known. Therefore, the calculation control unit 7 (or the far-end-position dispersion characteristic calculation unit 7b) first obtains the response characteristic A of the body of the DTS.

In a DTS, the measurement path differs between Stokes light ST and anti-Stokes light AS. Therefore, with the present measurement device, the response characteristic Ast based on the Stokes light ST and the response characteristic Aas based on the anti-Stokes light AS are obtained as the response characteristic A of the body of the DTS.

The influence of dispersion of the optical fiber 3 in the measurement result can be approximated to zero by performing a measurement (e.g., a backward Raman scattered light level measurement) with the optical fiber 3 unconnected to the body of the DTS. Therefore, the calculation control unit 7 (or the far-end-position dispersion characteristic calculation unit 7b) can obtain the response characteristic A (Ast and Aas) of the body of the DTS based on the result of the backward Raman scattered light level measurement with the optical fiber 3 unconnected to the body of the DTS. Moreover, the calculation control unit 7 (or the far-end-position dispersion characteristic calculation unit 7b) calculates the inverse characteristics (reciprocal) $Ast^{-1}$ and $Aas^{-1}$ of the response characteristic A (Ast and Aas) of the body of the DTS, and stores them in the parameter storing unit 7a.

The far-end-position dispersion characteristic calculation unit 7b obtains the dispersion characteristic $D_{end}$ of the optical fiber 3 at the far-end position thereof using Expression (2) above based on the inverse characteristics ($Ast^{-1}$ and $Aas^{-1}$) of the response characteristic A (Ast and Aas) of the body of the DTS and the response characteristic H of the optical fiber 3 at the far-end position thereof obtained as described above and stored in the parameter storing unit 7a.

Herein, the influence of dispersion of the optical fiber 3 along the distance direction is considered as being uniform. Thus, the per-unit-length dispersion characteristic $D_0$ of the optical fiber 3 can be obtained from the dispersion characteristic at the far-end position (the dispersion characteristic for the entire length of the optical fiber 3) $D_{end}$ of the optical fiber 3. That is, $D_n$ (the dispersion characteristic at the far-end position of the optical fiber 3 whose total length is n) is the convolution of n iterations of the per-unit-length fiber dispersion characteristic $D_0$ as shown in Expression (3) below. The per-unit-length dispersion characteristic calculation unit 7c obtains the per-unit-length dispersion characteristic $D_0$ of the optical fiber 3 using Expression (3), for example, from the dispersion characteristic $D_{end}$ for the entire length of the optical fiber 3.

$$D_{end}=D_n=D_0*D_0*D_0*D_0* \ldots *D_0 \qquad (3)$$

(there are a plurality (n) of iterations of $D_0$)

It can be seen from Expression (3) that the dispersion characteristic $D_m$ of the optical fiber 3 at an arbitrary position m along the optical fiber 3 is the convolution of m iterations of the per-unit-length dispersion characteristic $D_0$, as shown in Expression (4) below.

$$D_m=D_0*D_0*D_0*D_0* \ldots *D_0 \qquad (4)$$

(there are a plurality (m) of iterations of $D_0$)

From the per-unit-length dispersion characteristic $D_0$, the correction parameter calculation unit 7d obtains the dispersion characteristic $D_X$ and the inverse characteristic $D_X^{-1}$ thereof at each of different positions X along the distance direction of the optical fiber 3 by using Expression (4) above. Moreover, the correction parameter calculation unit 7d convolutes together the inverse characteristic $D_X^{-1}$ and the inverse characteristic $A^{-1}$ of the response characteristic A of the body of the DTS. Through this calculation, the correction parameter calculation unit 7d obtains the correction parameter for correcting the dispersion characteristic of the optical fiber 3.

The averaging calculation unit 7f averages Stokes light ST, thereby obtaining a linear value of Stokes light ST. Moreover, the averaging calculation unit 7f averages anti-Stokes light AS, thereby obtaining a linear value of anti-Stokes light AS. The spatial resolution calculation unit 7e convolutes the correction parameter calculated by the correction parameter calculation unit 7d with the linear values of Stokes light ST and anti-Stokes light AS obtained by the averaging calculation unit 7f.

With the present measurement device, it is possible to correct the dispersion characteristic of the routed optical fiber 3 by performing such a series of arithmetic operations. As a result, the present measurement device can improve the value of the spatial resolution, and can measure the actual temperature distribution along the optical fiber 3 with high precision.

Note that the actual measurement result of the temperature distribution along the optical fiber 3 may contain a noise component. Therefore, the dispersion characteristic $D_{end}$ of the optical fiber 3 at the far-end side thereof may contain a noise component.

In view of this, the present measurement device may be configured to reduce the noise component by filtering light of the high-frequency band to some extent. Specifically, the present measurement device may include a filter (not shown) for low-pass-filtering the obtained response characteristic H of the optical fiber 3 at the far-end position thereof. This filter removes the noise component on the high-frequency side. Where the filter characteristic of this filter is denoted as F, the relationship between the dispersion characteristic $D_{end}$ of the optical fiber 3 at the far-end position thereof, the response characteristic A of the body of the DTS and the response characteristic H' of the optical fiber 3 at the far-end position thereof is represented by Expression (5) below.

$$H'=A*D_{end}*F \qquad (5)$$

The dispersion characteristic $D_{end}$ of the optical fiber 3 at the far-end position thereof of Expression (5) is obtained by convoluting the inverse characteristic $F^{-1}$ of the filter characteristic F and the inverse characteristic $A^{-1}$ of the response characteristic A of the body of the DTS with the response characteristic H' of the optical fiber 3 at the far-end position thereof as shown in Expression (6) below. Thus, it is possible to obtain the dispersion characteristic $D_{end}$ of the optical fiber 3 at the far-end position thereof with the noise component reduced.

$$D_{end}=H'^{*}A^{-1}*F^{-1} \qquad (6)$$

Specifically, the convolution result between $F^{-1}$ and $A^{-1}$ is stored in the parameter storing unit 7a, instead of $A^{-1}$. The far-end-position dispersion characteristic calculation unit 7b performs a calculation (first calculation) of convoluting the filter characteristic F with the linear values of Stokes light ST and anti-Stokes light AS obtained by the averaging calculation unit 7f. Moreover, the far-end-position dispersion characteristic calculation unit 7b performs a calculation (second calculation) in which the convolution result between $F^{-1}$ and $A^{-1}$ is convoluted with this calculation result. Thus, the far-end-position dispersion characteristic calculation unit 7b can obtain the dispersion characteristic $D_{end}$ of the optical fiber 3 at the far-end position thereof. The operation (control) thereafter is as described above.

As described above, with the present measurement device, it is possible to appropriately grasp the dispersion characteristic at each of different positions along the sensor fiber, and make a correction such that the dispersion characteristic is canceled out. This realizes an optical fiber temperature distribution measuring device having good spatial resolution.

An embodiment of the present disclosure can be said to relate to an optical fiber temperature distribution measuring device using an optical fiber as a sensor, and specifically to an improvement to the spatial resolution.

After various known parameters of the optical fiber 3 to be used for measurement are input to the parameter storing unit 7a, a calculation of convoluting the response characteristic A of the body of the DTS with the optical fiber dispersion characteristic D may be performed as shown in Expression (1) by means of the far-end-position dispersion characteristic calculation unit 7b, thereby obtaining the response characteristic H of the optical fiber 3 at the far-end position thereof.

If the response characteristic A of the body of the DTS is known in advance, the inverse characteristic $A^{-1}$ is also known, and it is therefore possible to obtain the dispersion characteristic D of the optical fiber 3 at the far-end position thereof.

If the dispersion characteristic D at the far-end position is obtained through measurement by the DTS, since the influence of dispersion of the optical fiber 3 along the distance direction is considered to be uniform, it is possible to obtain the per-unit-length dispersion characteristic from the dispersion characteristic for the entire length of the optical fiber 3. That is, D (length: n) is the convolution of n iterations of the per-unit-length fiber dispersion $D_0$. The per-unit-length dispersion characteristic calculation unit 7c may obtain the per-unit-length dispersion characteristic from the dispersion characteristic for the entire length of the optical fiber 3.

When obtaining the dispersion characteristic D at the far end with the noise component reduced, the convolution result between $F^{-1}$ and $A^{-1}$ may be stored, instead of $A^{-1}$, in the parameter storing unit 7a, and the correction parameter calculation unit 7d may obtain the dispersion characteristic D at the far-end position by convoluting the convolution result between $F^{-1}$ and $A^{-1}$ with the result of convoluting the filter characteristic F with the obtained linear values of the Stokes light ST and the anti-Stokes light AS.

The optical fiber temperature distribution measuring device of the present embodiment may be any of first to third optical fiber temperature distribution measuring devices below.

A first optical fiber temperature distribution measuring device is an optical fiber temperature distribution measuring device using an optical fiber as a sensor, the optical fiber temperature distribution measuring device configured to measure a temperature distribution along the optical fiber by using Raman backscattered light, the optical fiber temperature distribution measuring device including: means for obtaining a dispersion characteristic of the optical fiber at a far-end position thereof; means for obtaining a per-unit-length dispersion characteristic of the optical fiber based on the dispersion characteristic of the optical fiber at the far-end position thereof; and means for calculating a correction parameter for correcting the dispersion characteristic of the optical fiber based on the dispersion characteristic at each of different positions along the optical fiber.

In a second optical fiber temperature distribution measuring device according to the first optical fiber temperature distribution measuring device, the means for calculating the correction parameter performs a convolution calculation of convoluting an inverse characteristic of the dispersion characteristic at each of different positions along the optical fiber with an inverse characteristic of a response characteristic of a body of the optical fiber temperature distribution measuring device.

In a third optical fiber temperature distribution measuring device according to the second optical fiber temperature distribution measuring device, the means for calculating the correction parameter further includes a convolution calculation of convoluting an inverse characteristic of a characteristic of a filter for removing a noise component on a high-frequency side.

With the first to third optical fiber temperature distribution measuring devices, it is possible to realize an optical fiber temperature distribution measuring device with good spatial resolution.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical fiber temperature distribution measuring device comprising:
   an optical fiber as a sensor; and
   a calculation control unit configured to measure a temperature distribution along the optical fiber by using backward Raman scattered light from the optical fiber to calculate an intensity ratio between the intensity (Ias) of anti-Stokes light and the intensity (Ist) of Stokes light, the calculation control unit comprising:
   a far-end-position dispersion characteristic calculation unit configured to obtain a dispersion characteristic ($D_{end}$) of the optical fiber at a far-end position thereof based on a response characteristic (A) of a body of the optical fiber temperature distribution measuring device and a response characteristic (H) of the optical fiber at the far-end position thereof, the dispersion characteristic being due to a variation of a distance over which the backward Raman scattered light travels through the optical fiber depending on the wavelength;

a per-unit-length dispersion characteristic calculation unit configured to obtain a per-unit-length dispersion characteristic ($D_0$) of the optical fiber based on the dispersion characteristic ($D_{end}$) of the optical fiber at the far-end position thereof; and a correction parameter calculation unit configured to calculate a correction parameter for correcting a dispersion characteristic of the optical fiber based on the per-unit-length dispersion characteristic ($D_0$) of the optical fiber.

2. The optical fiber temperature distribution measuring device according to claim 1, wherein the far-end-position dispersion characteristic calculation unit is further configured to obtain the dispersion characteristic ($D_{end}$) of the optical fiber at the far-end position thereof by convoluting an inverse characteristic ($F^{-1}$) of a characteristic (F) of a filter for removing a noise component on a high-frequency side and an inverse characteristic ($A^{-1}$) of the response characteristic (A) of the body of the optical fiber temperature distribution measuring device with the response characteristic (H) of the optical fiber at the far-end position thereof.

3. The optical fiber temperature distribution measuring device according to claim 1, wherein the correction parameter calculation unit is further configured to obtain the correction parameter by performing a convolution calculation of an inverse characteristic ($D_X^{-1}$) of a dispersion characteristic ($D_X$) at each of different positions (X) along a distance direction of the optical fiber and an inverse characteristic ($A^{-1}$) of the response characteristic (A) of the body of the optical fiber temperature distribution measuring device.

4. The optical fiber temperature distribution measuring device according to claim 3, wherein the correction parameter calculation unit is further configured to obtain the dispersion characteristic ($D_X$) at each of different positions along the optical fiber and the inverse characteristic ($D_X^{-1}$) thereof from the per-unit-length dispersion characteristic ($D_0$) of the optical fiber.

5. The optical fiber temperature distribution measuring device according to claim 1, wherein the calculation control unit further comprising:

an averaging calculation unit configured to obtain a linear value of Stokes light and a linear value of anti-Stokes light by averaging the Stokes light and the anti-Stokes light, respectively, of the backward Raman scattered light; and a spatial resolution calculation unit configured to perform a calculation of convoluting the correction parameter with the linear value of the Stokes light and the linear value of the anti-Stokes light.

6. The optical fiber temperature distribution measuring device according to claim 5, wherein the far-end-position dispersion characteristic calculation unit is further configured to obtain the dispersion characteristic ($D_{end}$) of the optical fiber at the far-end position thereof by performing a first calculation of convoluting a characteristic (F) of a filter for removing a noise component on a high-frequency side with the linear value of the Stokes light and the linear value of the anti-Stokes light, and a second calculation of convoluting an inverse characteristic ($F^{-1}$) of the characteristic (F) of the filter and an inverse characteristic ($A^{-1}$) of the response characteristic (A) of the body of the optical fiber temperature distribution measuring device with a result obtained by the first calculation.

7. The optical fiber temperature distribution measuring device according to claim 1, wherein the far-end-position dispersion characteristic calculation unit is further configured to obtain the dispersion characteristic ($D_{end}$) of the optical fiber at the far-end position thereof by convoluting the response characteristic (H) of the optical fiber at the far-end position thereof with an inverse characteristic ($A^{-1}$) of the response characteristic (A) of the body of the optical fiber temperature distribution measuring device.

8. The optical fiber temperature distribution measuring device according to claim 7, wherein the calculation control unit is further configured to obtain the response characteristic (H) of the optical fiber at the far-end position thereof using a known parameter of the optical fiber.

9. The optical fiber temperature distribution measuring device according to claim 8, wherein the calculation control unit is further configured to obtain the response characteristic (A) of the body of the optical fiber temperature distribution measuring device based on a result of a level measurement of the backward Raman scattered light of the body of the optical fiber temperature distribution measuring device with the optical fiber, the optical fiber being unconnected to the body of the optical fiber temperature distribution measuring device.

* * * * *